(12) United States Patent
Van Der Horst

(10) Patent No.: US 7,939,469 B2
(45) Date of Patent: May 10, 2011

(54) USE OF CMC IN DRILLING FLUIDS

(75) Inventor: Peter Marten Van Der Horst, Arnhem (NL)

(73) Assignee: Dow Global Technologies LLC

( * ) Notice: Subject to any disclaimer, the term of this patent is extended or adjusted under 35 U.S.C. 154(b) by 950 days.

(21) Appl. No.: 10/575,334

(22) PCT Filed: Oct. 15, 2004

(86) PCT No.: PCT/EP2004/011827
§ 371 (c)(1),
(2), (4) Date: May 22, 2006

(87) PCT Pub. No.: WO2005/040301
PCT Pub. Date: May 6, 2005

(65) Prior Publication Data
US 2007/0135311 A1    Jun. 14, 2007

(30) Foreign Application Priority Data

Oct. 17, 2003 (EP) .................................. 03078278

(51) Int. Cl.
*C09K 8/24* (2006.01)
*C08B 37/00* (2006.01)
*E21B 43/26* (2006.01)
(52) U.S. Cl. ..................... 507/113; 507/110; 166/305.1
(58) Field of Classification Search .................. 507/113, 507/110; 166/305.1
See application file for complete search history.

(56) References Cited

U.S. PATENT DOCUMENTS

| | | | |
|---|---|---|---|
| 3,625,889 A | 12/1971 | Branscum | 252/8.5 A |
| 3,668,122 A | 6/1972 | Branscum | 252/8.5 A |
| 3,954,628 A | 5/1976 | Sauber et al. | 252/8.5 A |
| 4,123,366 A | 10/1978 | Sauber et al. | 252/8.5 A |
| 5,028,342 A | 7/1991 | Opitz et al. | 252/8.513 |
| 6,281,172 B1 * | 8/2001 | Warren et al. | 507/110 |
| 2005/0031757 A1 * | 2/2005 | Boevink | 426/573 |
| 2006/0029711 A1 * | 2/2006 | Theeuwen et al. | 426/573 |

FOREIGN PATENT DOCUMENTS

| | | | |
|---|---|---|---|
| CA | 2463107 A1 * | 4/2003 | |
| CA | 2508234 A1 * | 6/2004 | |
| GB | 1179859 | 2/1970 | |
| GB | 2148354 A | 5/1985 | |

OTHER PUBLICATIONS

International Search Report for International Application No. PCT/EP2004/011827, Feb. 15, 2005.
Sikkema et al., "(Carboxymethyl)cellulose with Xanthan Gum Like Rheology," Macromolecules, vol. 22, No. 1, pp. 364-366 (1989).
Westra, "Rheology of (Carboxymethyl)cellulose with Xanthan Gum Properties," Macromolecules, vol. 22, No. 1, pp. 367-370 (1989).
American Petroleum Institute; "Recommended Practice Standard Procedure for Field Testing Water-Based Drilling Fluids" (RP 13B-1) First Edition, pp. 1-46 (Jun. 1, 1990).

* cited by examiner

*Primary Examiner* — Timothy J. Kugel
*Assistant Examiner* — Atnaf Admasu

(57) ABSTRACT

The invention relates to a water-based drilling fluid composition comprising a carboxymethyl cellulose (CMC), wherein the CMC is characterized by forming a gel at 25° C. after high-shear dissolution in a 0.3 wt % aqueous sodium chloride solution, the final content of the CMC in the aqueous sodium chloride solution being 1 wt % for a CMC having a degree of polymerization of >4,000, 1.5. wt % for a CMC having a DP of >3,000-4,000, 2 wt % for a CMC having a DD of 1,500-3,000, and 4 wt % for a CMC having a DP of <1,500, the gel being a fluid having a storage modulus (G') which exceeds the loss modulus (G") over the entire frequency region of 0.01-10 Hz when measured on an oscillatory rheometer operating at a strain of 0.2.

9 Claims, No Drawings

USE OF CMC IN DRILLING FLUIDS

This case was filed under the Patent Cooperation Treaty on Oct. 15, 2004, and claims priority of European patent application No. 03078278.3 filed on Oct. 17, 2003.

The present invention relates to water-based drilling fluid compositions comprising carboxymethyl cellulose (CMC). These drilling fluid compositions are employed in well-drilling operations.

The success of a well-drilling operation depends on many factors, none of which is more important than the drilling fluid composition (also known as drilling mud). Drilling fluid compositions perform a variety of functions which influence the drilling rate, cost, efficiency, and safety of the operation. More specifically, drilling fluid compositions prevent the influx of formation fluids into the wellbore, seal exposed permeable formations to prevent leakage of the drilling fluid into the formation, maintain the stability of exposed formulations, cool and lubricate the bit and drill string, hold back pressure, and stabilize the formation, e.g., shale inhibition. Furthermore, the drilling fluid should exhibit a rheology profile which allows it to carry the cuttings to the surface. How well the drilling fluid composition fulfills these requirements greatly affects the cost of the operation and the productivity of the well.

During operation, drilling fluid compositions are pumped down a hollow drill string, through nozzles in the bit at the bottom of the well, and back up the annulus formed by the hole or casing and drill string to the surface. Once it reaches the surface, the drilling fluid is passed through a series of vibrating screens, settling tanks, hydrocyclones, and centrifuges to remove formation debris brought to the surface. It is then treated with additives to obtain the desired set of properties, pumped back into the well, and the cycle is repeated.

Drilling fluid compositions are generally composed of liquids, e.g., water, petroleum oils, synthetic oils and other organic liquids; dissolved inorganic and organic additives; and suspended, finely divided solids of various types. Drilling fluids are classified as to the nature of the continuous phase; thus there are four main divisions: gaseous (including foam), water-base, oil-base, or synthetic. Growing concern among government and environmental agencies over the environmental impact of drilling fluids has led to a significant increase in the industry's reliance on water-based muds. In fact, about 85% of all drilling fluid compositions used today are water-based systems. The types depend on the composition of the water phase (pH, ionic content, etc), viscosity builders (clays, polymers or a combination), filtration control agents (clays, polymers or a combination), and other rheological control, agents (deflocculants or dispersants (qv)). Generally, there are six main categories or types of water-based drilling fluid compositions:

Fresh Water. Fresh water fluids range from clear water having no additives to high-density drilling muds containing clays, barite, and various organic additives. The composition of the mud is determined by the type of formation to be drilled. When a viscous fluid is required, clays and/or water-soluble polymers (qv) are added. Fresh water is ideal for formulating stable drilling fluid compositions, as many mud additives are most effective in a system of low ionic strength. Inorganic and/or organic additives control the rheological behaviour of the clays, particularly at elevated temperatures. Water-swellable and water-soluble polymers and/or clays may be used for filtration control. The mud pH is generally alkaline and, in fact, viscosity control agents like montmorillonite clays are more efficient at a pH >9. Sodium hydroxide is by far the most widely used alkalinity control agent. Fresh water muds can be weighted with insoluble agents to the desired density required to control formation pressures.

Seawater. Many offshore wells are drilled using a seawater system because of ready availability. Seawater muds generally are formulated and maintained in the same way as fresh water muds. However, because of the presence of dissolved salts in seawater, more electrolyte stable additives are needed to achieve the desired flow and filtration (qv) properties.

Salt Water. In many drilling areas both onshore and offshore, salt beds or salt domes are penetrated. Saturated salt muds are used to reduce the hole enlargement that would result from formation-salt dissolution through contact with an undersaturated liquid. In the United States, salt formations are primarily made up of sodium chloride. In other areas, e.g., northern Europe, salt may be composed of mixed salts, predominantly magnesium and potassium chlorides. It has become quite common to use high (20-23 wt % NaCl) salt muds in wells being drilled in deep (>500 m water depth) water regions of the Gulf of Mexico. The reasons are twofold: stabilization of water-sensitive shales and inhibition of the formation of gas hydrates. The high salinity of salt water muds may require different clays and organic additives from those used in fresh or seawater muds. Salt water clays and organic polymers contribute to viscosity. The filtration properties are adjusted using starch (qv) or cellulosic polymers. The pH ranges from that of the makeup brine, which may be somewhat acidic, to 9-11 through the use of sodium hydroxide or lime.

Calcium Treated. Fresh or seawater muds may be treated with gypsum or lime to alleviate drilling problems that may arise from drilling water-sensitive shale or clay-bearing formations. Gyp muds (gypsum added) are generally maintained at a pH of 9-10, whereas lime muds (lime added) are in the 12-13 pH range. Calcium-treated muds generally require more additives to control flow and filtration properties than those without gypsum or lime do.

Potassium Treated. Generally potassium-treated systems combine one or more polymers and a potassium ion source, primarily potassium chloride, in order to prevent problems associated with drilling certain water-sensitive shales. The flow and filtration properties may be quite different from those of the other water-base fluids. Potassium muds have been applied in most active drilling regions around the world. Environmental regulations in the United States have limited the use of potassium muds in offshore drilling owing to the apparent toxicity of high potassium levels in the bioassay test required by discharge permits.

Low Solids. Fresh water, clay, and polymers for viscosity enhancement and filtration control make up low-solids and so called non-dispersed polymer muds. Low-solids muds are maintained using minimal amounts of clay and require removal of all but modest quantities of drill solids. Low-solids muds can be weighted to high densities, but are used primarily in the unweighted state. The main advantage of these systems is the high drilling rate that can be achieved because of the lower colloidal solids content. Polymers are used in these systems to provide the desired rheology, especially xanthan has proven to be an effective solids suspending agent. These low-solids muds are normally applied in hard formations where increasing the penetration rate can reduce drilling costs significantly and the tendency for solids buildup is minimal.

In the drilling compositions as described above, sodium carboxymethyl cellulose (CMC) and polyanionic cellulose (PAC), a CMC which has a degree of substitution (DS) usually greater than 1.0, are two of the more widely used anionic polymers which serve to control viscosity and filtration rates.

A higher DS CMC (e.g. PAC) offers good fluid loss reduction in an electrolyte-containing system with a smectite-type clay such as bentonite. However, the effectiveness of CMC, being a polyelectrolyte, as a viscosity builder has its limitations, as its effectiveness decreases with increasing electrolyte concentration. Thus, regular CMC is mostly suitable for electrolyte-poor drilling fluid compositions, such as fresh water-based drilling fluid compositions. Although high DP CMCs and PACs are used as viscosity builders (viscosifiers), the regular grades do not have the good suspension carrying properties (high low-shear viscosity) which are needed to bring the cuttings efficiently to the surface.

Alternatively, xanthan gum is employed as viscosity builder and suspending agent. Xanthan gum has very suitable rheological properties. It forms a gel within a short period of time when drilling circulation is slow or interrupted. This enables immobilization of dispersed solids in the fluid composition. After circulation is resumed, the gel easily transforms into a flowing fluid, thereby maintaining a good dispersion of the solids contained in the fluid composition.

However, xanthan gum is relatively expensive; Moreover, it is only stable at temperatures below about 120° C., which makes it less suitable for drilling at temperatures exceeding 120° C. Furthermore many xanthan grades contain very fine insoluble material, usually residues from the fermentation production process. These insoluble materials are undesired for drilling operations, as they cause, e.g., more difficult hole cleaning. Only the more expensive xanthan grades do not have these insolubles.

It is an object of the present invention to provide a water-based drilling fluid composition comprising a carboxymethyl cellulose which has improved pseudoplastic viscosity and gelling properties compared to conventional CMC.

This object is achieved by providing a water-based drilling fluid composition comprising a carboxymethyl cellulose (CMC), wherein the CMC is characterized by forming a gel at 25° C. after high-shear dissolution in a 0.3 wt % aqueous sodium chloride solution, the final content of the CMC in the aqueous sodium chloride solution being 1 wt % for a CMC having a degree of polymerization (DP) of >4,000, 1.5 wt % for a CMC having a DP of >3,000-4,000, 2 wt % for a CMC having a DP of 1,500-3,000, and 4 wt % for a CMC having a DP of <1,500, the gel being a fluid having a storage modulus (G') which exceeds the loss modulus (G") over the entire frequency region of 0.01-10 Hz when measured on an oscillatory rheometer operating at a strain of 0.2.

The drilling fluid composition of the present invention has good gelling properties as it builds up a gel within the first 10 seconds after circulation of the drilling fluid composition is slow or interrupted. The gel strength is sufficiently high to enable immobilization of the solids contained in the drilling fluid composition, and thus maintaining their dispersion. When circulation is resumed, the gel transforms easily into a fluid enabling the drilling fluid to flow. The rheology profile of the CMC according to the invention shows a pseudoplastic (=shear-thinning) behaviour, which makes this CMC a very suitable additive for adjusting the rheology and suspension characteristics of the fluid. In the context of the present specification the term "rheology profile" refers to a viscosity profile as a function of shear rate. A further advantage of the drilling fluid composition of the invention is that the CMC of the invention combines a good rheology profile with a good fluid loss reduction. The fluid loss is similar or even less than observed for regular CMC.

In contrast to regular CMC, the CMC according to the invention may have improved gelling properties when used in fluid compositions comprising electrolytes, which make this CMC suitable for use in salt or electrolyte-containing drilling fluids, for example.

In contrast to regular CMC, the CMC according to the invention shows a less temperature dependant viscosity behavior. Regular CMC's show a strong decrease of the viscosity at high temperatures while the CMC according to the invention has a more flat rheology profile when measured as function of the temperature. This is very attractive for drilling fluids.

The definition of a gel can also be given in terms of the loss angle, delta, which can be calculated from the formula: G"/G'=tan delta. The CMC to be used in accordance with the present invention has a delta smaller than 45°.

The CMC according to the invention obtains its highest viscosity and gelation properties when dissolved under high shear mixing. Drilling fluids usually are prepared under such high shear mixing conditions. For many fluid testing procedures Hamilton Beach high-shear mixers are used. Other apparatus for high-shear dissolution are known to a person of ordinary skill in the art High-shear dissolution typically is achieved by using a Waring blender or Ultra-Turrax. These apparatus typically operate at approx. 10,000 rpm or more.

In the context of the present specification, the abbreviation CMC stands for carboxymethyl cellulose as well as for salts of carboxymethyl cellulose like sodium carboxymethyl cellulose, for example.

The CMC to be used In accordance with the present invention can be obtained by the processes described by D. J. Sikkema and H. Janssen in *Macromolecules,* 1989, 22, 364-366, or by the process disclosed in WO 99/20657. The procedures and apparatus to be used are conventional in the art and variations on these known procedures can easily be made by a person skilled in the art using routine experimentation. In particular, we have found that the amount of water which is used in the process and the temperature during the alkalization are important parameters for obtaining the CMC in accordance with the present invention. Typically, a 20-40 wt % (final content) aqueous alkali metal hydroxide solution (e.g. aqueous sodium hydroxide solution) is used.

The characterization of CMCs depends mainly on rheology measurements, in particular viscosity measurements. See, e.g. J. G. Westra, *Macromolecules,* 1989, 22, 367-370. In this reference, the properties of the CMCs obtained via the process disclosed by Sikkema and Janssen in *Macromolecules,* 1988, 22, 364-366, are analyzed. Important properties of a CMC are its viscosity, thixotropy, and shear-thinning effect.

The rheology of aqueous solutions of the CMC according to the invention is rather complex and depends on a number of parameters including the degree of polymerization (DP) of the cellulose, the degree of substitution (DS) of the carboxymethyl groups, and the uniformity or non-uniformity of substitution, i.e. the distribution of carboxymethyl groups over the cellulose polymer chains.

The degree of polymerization (DP) of the CMC to be used in accordance with the present invention can vary over a broad range. It is noted that with the term "degree of polymerization" a skilled person will understand that this term refers to the average degree of polymerization which means the average number of glucose units in the cellulose polymer chain. In the context of the present invention, a distinction is made between the following DP ranges, i.e. >4,000, >3,000-4,000, 1,500-3,000, and <1,500. Typically, the CMC is prepared from linters cellulose (DP typically >4,000-7,000), wood cellulose (DP typically 1,500-4,000) or depolymerized wood cellulose (DP typically <1,500). Depending on the required performance and functionality of the fluid a CMC according to the invention with a certain DP value can be used. Different DP values will give different pseudoplasticity, gel-strengths and thickening performance.

The CMC to be used in accordance with the present invention typically has a DS of at least 0.6, preferably at least 0.7, and most preferably at least 0.8, and typically of at most 1.3, most preferably at most 1.2.

The Brookfield viscosity (Brookfield LVF, spindle 4, 30 rpm, 25° C.) is measured after high-shear dissolution, for example using a Waring blender, of the CMC of the present invention in a 0.3 wt % aqueous sodium chloride solution, the final content of the CMC in the aqueous sodium chloride solution being 1 wt % for a CMC having a degree of polymerization (DP) of >4,000, 1.5 wt % for a CMC having a DP of >3,000-4,000, 2 wt % for a CMC having a DP of 1,500-3,000, and 4 wt % for a CMC having a DP of <1,500. Preferably, a CMC having a viscosity of more than 9,000, more preferably of more than 9,500, even more preferably of more than 10,000 mPa·s, is used.

Aqueous solutions of the CMC to be used in accordance with the present invention are thixotropic. The thixotropy can be determined by preparing a 1 wt % aqueous CMC solution and measuring the viscosity as a function of the shear rate (i.e. 0.01-300 $s^{-1}$) on a controlled rate or controlled stress rheometer in rotational mode at 25° C. using a cone-plate, parallel-plate or bob-cup geometry. An upcurve is recorded in which the shear rate is increased from 0.01 to 300 $s^{-1}$ in 3 minutes, immediately followed by the recording of a downcurve in which the shear rate is decreased over the same range and time. For a CMC in accordance with the present invention, the upcurve will be at a higher viscosity level than the downcurve and the area between the two curves is a measure for thixotropy, also referred to as the thixotropy area. Typically, one speaks of a thixotropic solution when the area has a value of 5 Pa·s·$s^{-1}$ or more when measured at 2 to 4 hours after preparation of the aqueous solution.

It is noted that drilling fluid compositions of the present invention are able to form a gel with desirable gel strength within the first 10 seconds after the circulation of the fluid composition is slowed down or interrupted. Without being bound by theory, it is believed that fast build-up of the gel strength of the drilling fluid composition in the first 10 seconds after slow or interrupted drilling fluid circulation, is due to the presence of lowly or non-substituted parts of the CMC according to the invention, which parts are easily accessible and readily interact with each other. The gel strength after 10 seconds of slow or interrupted circulation may be improved if salts or electrolytes are present in the drilling fluid composition.

The CMC of the present invention can be used in a wide variety of drilling fluid compositions, which are known in the art.

The drilling fluid compositions of the present invention may optionally contain various other ingredients conventionally employed in water-based fluids. For example, such additional ingredients can include-conventional organic polymer additives or any conventionally used clay or both. Clay is mostly used in combination with polymers. There are also clay-free systems, the so-called polymer mud systems. Examples of such organic polymer additives are conventional CMC, PAC, starch, modified starch, xanthan. Examples of clays are smectite-type clays such as montmorillonites like bentonite, mixed metal layer hydroxide, attapulgite, and sepiolite. Of these clays bentonite is most preferred.

Additionally, the drilling fluids of the present invention can contain other usual additives such as weighing agents, thinners, inhibiting agents, electrolytes, pH adjusting agents, etc.

The pH of the drilling fluids of the present invention is preferably maintained at a pH of from 2-13, preferably from 8-11, most preferably 8.5-10.5. If a clay such as bentonite is used in the drilling fluid composition of the present invention, the latter pH range is preferred.

In most drilling operations the drilling fluid composition experiences a high shear. This is particularly advantageous if the CMC of the invention is employed in such fluid compositions, as these CMCs gelate when exposed to a high shear. Applying a high shear improves the gelling properties of the CMC considerably.

The gelling properties of the CMC of the present invention can also be improved by a heat treatment. Preferably, the CMC is treated at 50° C. or higher, more preferably at 60° C. or higher, and most preferably at 70° C. or higher. The drilling fluid composition of the invention can be employed in drilling operations up to a temperature of about 140° C. Above this temperature the CMC of the invention generally decomposes. Compared to fluid compositions comprising xanthan gum (which deteriorates above a temperature of about 120° C.), deeper drilling operations at higher temperatures can be carried out using the drilling fluid composition of the present invention.

The amount of CMC to be used in accordance with the present invention varies and is dependent on the composition of the drilling fluid composition and the intended use of the drilling fluid composition. Typically, an amount of at least 0.05 wt %, preferably at least 0.1 wt %, most preferably at least 0.2 wt %, and at most 3 wt %, preferably at most 2 wt %, most preferably 1 wt %, is used, based on the total weight of the drilling fluid composition. The CMC of the invention may have a different function from regular CMC, and can be used in combination with regular CMC or other polymers. It may also serve to partially or completely replace the conventionally used viscosity builders such as xanthan gum. The optimal amount of CMC to be used in accordance with the present invention can be determined by a person skilled in the art by routine experimentation.

The CMC to be used In accordance with the present invention typically is added as a dry powder, but it can also be supplied as suspension or as an aqueous solution. Furthermore, the CMC according to the invention can be a purified grade or a technical grade (contains the by-products NaCl and sodium glycolates).

EXAMPLES

Various drilling fluids comprising seawater and a viscosifier were prepared. In all drilling fluids, the viscosifier was present in an amount of 0.5 wt %, based on the total weight of the drilling fluid. The seawater was prepared by adding the constituents of Table 1 to water in the given amounts.

TABLE 1

| Constituent | Amount (g/l) |
|---|---|
| $NaHCO_3$ | 0.206 |
| $Na_2SO_4$ | 3.400 |
| $MgCl_2 \cdot 6H_2O$ | 11.786 |
| $CaCl_2 \cdot 6H_2O$ | 1.595 |
| $SrCl_2 \cdot 6H_2O$ | 0.021 |
| KCl | 5.801 |
| NaCl | 25.402 |

As viscosifier three CMCs which are in accordance with the invention, viz. CMC-A, CMC-B and CMC-C, were used. CMC-A, CMC-B, and CMC-C are CMCs which are in accordance with the present invention, i.e. they form a gel at 25° C. when dissolved in an amount of 0.3 wt % aqueous sodium chloride solution under high shear.

CMC-A: Prepared from linters cellulose. DP of 6,500. DS of 1.08. A 1 wt % aqueous solution of this product has a Brookfield viscosity (LVF, spindle 4, 30 rpm, 25° C.) of 5,840 mPa·s using a Heidolph mixer at 2,000 rpm. CMC-A has a weak pseudoplastic and thixotropic rheology that becomes stronger in salt-containing solutions. 1 wt % of CMC-A in a 0.3 wt % aqueous NaCl solution has a Brookfield viscosity (LVF, spindle 4, 30 rpm, 25° C.) of 7,200 mPa·s using a Heidolph mixer at 2,000 rpm, and of 5,000 mPa·s using a Waring blender at 10,000 rpm (i.e. high shear). A 5 wt % aqueous NaCl solution comprising 1 wt % of CMC-A has a Brookfield viscosity (LVF, spindle 4, 30 rpm, 25° C.) of 7,460 mPa·s using a Heidolph mixer at 2,000 rpm, and of 9,980 mPa·s using a Waring blender at 10,000 rpm.

CMC-B: Prepared from linters cellulose. DP of 6,500. DS of 1.06. A 1 wt % aqueous solution of this product has a Brookfield viscosity (LVF, spindle 4, 30 rpm, 25° C.) of 5,480 mPa·s using a Heidolph mixer at 2,000 rpm. CMC-B has a weak pseudoplastic and thixotropic rheology that becomes stronger in salt-containing solutions. 1 wt % of CMC-B in a 0.3 wt % aqueous NaCl solution has a Brookfield viscosity (LVF, spindle 4, 30 rpm, 25° C.) of 4,500 mPa·s using a Heidolph mixer at 2,000 rpm, and of 4,360 mPa·s using a Waring blender at 10,000 rpm. A 5 wt % aqueous NaCl solution comprising 1 wt % of CMC-B has a Brookfield viscosity (LVF, spindle 4, 30 rpm, 25° C.) of 5,580 mPa·s using a Heidolph mixer at 2,000 rpm, and of 7,600 mPa·s using a Waring blender at 10,000 rpm.

CMC-C: Prepared from linters cellulose. DP of 6,500. DS of 0.95. A 1 wt % aqueous solution of this product has a Brookfield viscosity (LVF, spindle 4, 30 rpm, 25° C.) of 4,980 mPa·s using a Heidolph mixer at 2,000 rpm. CMC-C has a weak pseudoplastic and thixotropic rheology that becomes stronger in salt-containing solutions. 1 wt % of CMC-C in a 0.3 wt % aqueous NaCl solution has a Brookfield viscosity (LVF, spindle 4, 30 rpm, 25° C.) of 4,500 mPa·s using a Heidolph mixer at 2,000 rpm, and of 4,000 mPa·s using a Waring blender at 10,000 rpm. A 5 wt % aqueous NaCl solution comprising 1 wt % of CMC-C has a Brookfield viscosity (LVF, spindle 4, 30 rpm, 25° C.) of 6,560 mPa·s using a Heidolph mixer at 2,000 rpm, and of 5,460 mPa·s using a Waring blender at 10,000 rpm.

For comparison, drilling fluids comprising conventional viscosifiers, viz. a regular PAC, namely Staflo Regular™ (ex Akzo Nobel), and two commercially available xanthans, namely Xanvis™ and Keizan XCD™ (both ex kelco Oil field group), were prepared.

The rheological properties of these drilling fluids were determined using standard techniques as described in *API Recommended Practice: Standard Procedures for Field Testing Water-Based Drilling Fluids*, RP 13B-1, 1st ed., June 1990, Amer. Pet. Inst. The rheological properties of the composed drilling fluids were measured using a standard Fann viscometer. The plastic viscosity (referred to as PV) of the drilling fluid was obtained by subtracting the 300 reading from the 600 reading, while the Yield Point (referred to as YP) of the fluid was determined by subtracting the PV value from the 300 reading. Furthermore, the 10 sec. gel-strength and the 10 min. gel-strength were measured using the Fann viscometer at a rotation speed of 600 rpm until a stable reading was obtained. The viscometer was then stopped for 10 sec. and the viscosity was measured at a rotation speed of 3 rpm. The maximum reading of the viscometer is given as the 10 sec. gel strength. Similarly, the 10 min. gel strength was measured at a rotational speed of 600 rpm until a steady state was achieved. The viscometer was then stopped for 10 min. and the viscosity was measured at a rotational speed of 3 rpm. The maximum reading gives the 10 min. gel strength.

The above rheological properties of the various sea water solutions as measured using the Fann viscometer are shown in the Table below.

TABLE 2

| Product | Fann readings (rpm) | | | | AV (Pa) | PV (mPa · s) | YP (Pa) | gel strength (Pa) | |
| --- | --- | --- | --- | --- | --- | --- | --- | --- | --- |
| | 3 | 6 | 300 | 600 | | | | 10 sec | 10 min |
| Staflo Regular | 2 | 4 | 65 | 98 | 49 | 33 | 32 | 2.2 | 2.3 |
| A | 4 | 7 | 74 | 107 | 54 | 33 | 41 | 2.4 | 3.7 |
| B | 5 | 8 | 81 | 116 | 58 | 35 | 46 | 4.7 | 4.9 |
| C | 6 | 9 | 87 | 124 | 62 | 37 | 50 | 5 | 5.4 |
| Xanvis | 11 | 14 | 37 | 53 | 27 | 16 | 21 | 6.4 | 27.5 |
| Kelzan XCD | 10 | 12 | 37 | 53 | 27 | 16 | 21 | 9.2 | 18.8 |

From Table 2 it can be deduced that the CMCs of the present invention yield drilling fluids having a good initial gel strength which changes only slightly over time, whereas the xanthan-containing drilling fluids show a distinct increase in gel strength within 10 minutes. Furthermore, it is shown that drilling fluids comprising CMC in accordance with the invention have a Yield Point (YP) higher than that of the drilling fluids comprising xanthan or regular CMC, which causes the drilling fluids according to the invention to have an improved carrying capability of drilled cuttings.

The invention claimed is:

1. A water-based drilling fluid composition comprising:
   water,
   a smectite type of clay, and
   a carboxymethyl cellulose (CMC), wherein the CMC is characterized by forming a shear-thinning gel at 25° C. after high-shear dissolution in a 0.3 wt % aqueous sodium chloride solution, the final content of the CMC in the aqueous sodium chloride solution being 1 wt % for a CMC having a degree of polymerization (DP) of more than 4000, 1.5 wt % for a CMC having a DP of 3,000 to 4,000, 2 wt % for a CMC having a DP of 1,500 to less than 3,000, and 4 wt % for a CMC having a DP of less than 1,500, the gel being a fluid having a storage modulus (G') which exceeds the loss modulus (G") over the entire frequency region of 0.01-10 Hz when measured on an oscillatory rheometer operating at a strain of 0.2, and wherein the gel reaches at least 60% of its gel strength within ten seconds of cessation of shear, wherein the drilling fluid composition has sufficient rheology properties for carrying cuttings.

2. The drilling fluid composition of claim 1, wherein the CMC has a Brookfield viscosity of more than 9,000 mPas after high-shear dissolution in a 0.3 wt % aqueous sodium chloride solution, the final content of the CMC in the aqueous sodium chloride solution being 1 wt % for a CMC having a degree of polymerization (DP) of more than 4,000, 1.5 wt % for a CMC having a DP of more than 3,000 to 4,000, 2 wt % for a CMC having a DP of 1,500 to 3,000, and 4 wt % for a CMC having a DP of less than 1,500.

3. The drilling fluid composition of claim 2 wherein the smectite type of clay is bentonite, a mixed metal layer hydroxide, attapulgite, sepiolite, or mixtures thereof.

4. The drilling fluid composition of claim 2, comprising from 0.05 to 3 weight percent of the CMC, based on the total weight of the drilling fluid.

5. The drilling fluid composition of claim 2, further comprising electrolytes.

6. The drilling fluid composition of claim 1 wherein the smectite type of clay is bentonite, a mixed metal layer hydroxide, attapulgite, sepiolite, or mixtures thereof.

7. The drilling fluid composition of claim 1, comprising from 0.05 to 3 weight percent of the CMC, based on the total weight of the drilling fluid.

8. The drilling fluid composition of claim 1, further comprising electrolytes.

9. A method of well-drilling, comprising:
forming a water-based drilling fluid composition comprising water, a smectite type of clay, and a carboxymethyl cellulose (CMC), wherein the CMC is characterized by forming a shear-thinning gel at 25° C. after high-shear dissolution in a 0.3 wt % aqueous sodium chloride solution, the final content of the CMC in the aqueous sodium chloride solution being 1 wt % for a CMC having a degree of polymerization (DP) of more than 4000, 1.5 wt % for a CMC having a DP of 3,000 to 4,000, 2 wt % for a CMC having a DP of 1,500 to less than 3,000, and 4 wt % for a CMC having a DP of less than 1,500, the gel being a fluid having a storage modulus (G') which exceeds the loss modulus (G") over the entire frequency region of 0.01-10 Hz when measured on an oscillatory rheometer operating at a strain of 0.2, and wherein the gel reaches at least 60% of its gel strength within ten seconds of cessation of shear, and
introducing said water-based drilling fluid composition into the well-bore.

* * * * *